No. 897,349. PATENTED SEPT. 1, 1908.
G. H. COATES.
FLEXIBLE SHAFT.
APPLICATION FILED JUNE 8, 1906.
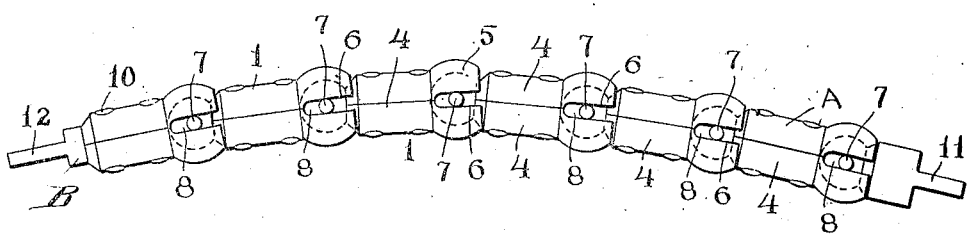
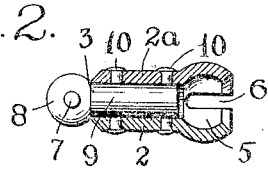
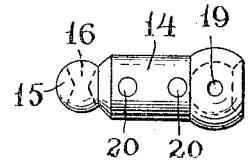
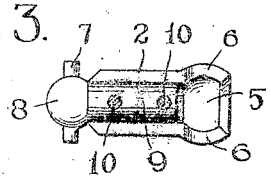
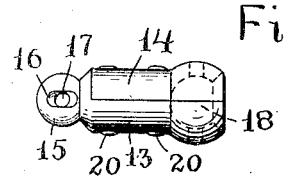
Witnesses
Roy D. Tolman
Penelope Comberbach
Inventor
George H. Coates.
By Rufus B. Fowler
Attorney

UNITED STATES PATENT OFFICE.

GEORGE H. COATES, OF WORCESTER, MASSACHUSETTS.

FLEXIBLE SHAFT.

No. 897,349.  Specification of Letters Patent.  Patented Sept. 1, 1908.

Application filed June 8, 1906. Serial No. 320,918.

*To all whom it may concern:*

Be it known that I, GEORGE H. COATES, a citizen of the United States, residing at Worcester, in the county of Worcester and Commonwealth of Massachusetts, have invented a new and useful Improvement in Flexible Shafts, of which the following is a specification, accompanied by drawings, forming a part of the same, in which—

Figure 1 is a side view of my improved flexible shaft. Fig. 2 is a central vertical section of a link used in my improved shaft. Fig. 3 is a view of the spherical head and cylindrical shank and one half of the inclosing case of the same.

Similar reference letters and figures refer to similar parts in the different views.

My invention relates to an improved link for flexible shafts, by which I attain increased economy and ease of construction, combined with facility in assembling the shaft, and it consists in the construction and arrangement of parts as hereinafter described and pointed out in the annexed claims.

Referring to the accompanying drawings, Figure 1 represents a short piece of flexible shafting embodying my invention, and comprising a series of links each consisting of members 2, $2^a$ and 3. The members 2 and $2^a$ are duplicates and together form a hollow cylindrical stem 4 having at one end a spherical socket 5, provided on diametrically opposite sides with longitudinal s s 6 to receive a pin 7 projecting on either side of the spherical tip 8, formed on one end of and preferably integral with a cylindrical shank 9, which fits within the hollow cylindrical stem 4, and is held therein by pins 10. The members 2, $2^a$, and 3 are so designed that they may be stamped or drop forged thereby insuring a correct fit between the shank 9 and the hollow stem formed by the duplicate members 2, $2^a$.

In assembling the flexible shaft the shank 9 of the member 3 is first placed on one half of the member 2, as shown in Fig. 3. The other half of the member 2 is then placed in position and the members of each link are fastened by the pins 10, the spherical tip 8 of the next adjacent link having been previously inserted in the spherical socket formed by the members 2, $2^a$. As the socket 5 incloses more than half of the tip 8 it prevents the withdrawal of the tip 8 while permitting movement of the tip 8 on the pin 7 as a center. The slots 6 also permit a rocking movement of the links on each other in a plane at right angles to their movement around the pin 7.

At one end of the flexible shaft I provide a shank 11 having a spherical tip 8 fitting the socket 5 of the end link A and at the other end a shank 12 forming a part of the link B. Rotary movement imparted to the shank 11 is transmitted to the shank 12 by the pins 7 turning each succeeding link throughout the entire length of the shaft.

I claim,

1. In a flexible shaft, a link composed of members forming a hollow cylindrical stem with a spherical socket at one end, a cylindrical shank inclosed in said hollow cylindrical stem and having a spherical tip on its projecting end opposite from said spherical socket, and transverse pins passing through said cylindrical stem and said cylindrical shank.

2. In a flexible shaft, a link composed of members forming a hollow cylindrical stem with a spherical socket at one end provided with diametrically opposite openings, a cylindrical shank inclosed in said hollow cylindrical stem and attached thereto, said shank having a spherical tip on its projecting end provided with pins on either side thereof, with said pins arranged to be inserted in the openings in the spherical socket of the next link, whereby rotary movement is imparted from one link to the next link.

3. In a flexible shaft, a link composed of separable members forming a hollow cylindrical stem, with a spherical socket at one end provided with diametrically opposite openings, a cylindrical shank inclosed in said hollow cylindrical stem and attached thereto, said shank having a spherical tip on its projecting end provided with a transverse pin, with the ends of said pin arranged to be inserted in the openings in the spherical socket of the next link, whereby rotary movement is imparted from one link to the next link.

GEORGE H. COATES.

Witnesses:
PENELOPE COMBERBACH,
RUFUS B. FOWLER.